United States Patent
Nitsch

(10) Patent No.: US 9,783,331 B2
(45) Date of Patent: Oct. 10, 2017

(54) DEVICE FOR FORMING PACKAGED UNITS

(71) Applicant: KHS GmbH, Dortmund (DE)

(72) Inventor: Thomas Nitsch, Kleve (DE)

(73) Assignee: KHS GmbH, Dortmund (DE)

( * ) Notice: Subject to any disclaimer, the term of this patent is extended or adjusted under 35 U.S.C. 154(b) by 205 days.

(21) Appl. No.: 14/403,239

(22) PCT Filed: Mar. 21, 2013

(86) PCT No.: PCT/EP2013/000856
§ 371 (c)(1),
(2) Date: Nov. 24, 2014

(87) PCT Pub. No.: WO2013/174464
PCT Pub. Date: Nov. 28, 2013

(65) Prior Publication Data
US 2015/0107779 A1    Apr. 23, 2015

(30) Foreign Application Priority Data
May 23, 2012   (DE) .................. 10 2012 010 087

(51) Int. Cl.
*B65B 17/02* (2006.01)
*B65B 21/06* (2006.01)
(Continued)

(52) U.S. Cl.
CPC .............. *B65B 17/02* (2013.01); *B65B 21/06* (2013.01); *B65B 35/30* (2013.01); *B65B 35/54* (2013.01);
(Continued)

(58) Field of Classification Search
CPC ............ Y10T 156/1744; B65G 47/088; B65G 47/842; B65G 54/02; B65G 47/841;
(Continued)

(56) References Cited

U.S. PATENT DOCUMENTS 4,078,357 A    3/1978  Ida
5,261,997 A  * 11/1993  Inselmann ............. A41H 43/04
                                                100/138
(Continued)

FOREIGN PATENT DOCUMENTS

DE          23 31 193        1/1975
DE          2331193 A1  *    1/1975
(Continued)

OTHER PUBLICATIONS

English translation of DE102012005925B3.*

Primary Examiner — Michael Tolin
(74) Attorney, Agent, or Firm — Occhiuti & Rohlicek LLP

(57) ABSTRACT

An apparatus for bundling containers includes a linear conveyor, a guide element, conveying elements, and application elements, each of which applies adhesive to a portion of a container surface, The conveying elements are driven and controllable to travel along the conveyor and to circulate along the guide element. Each conveying element has a container guide that rotates relative to the conveying element. The guide element has a feed strand with central, transition, and end sections that merge into each other. The central section is further from the central axis than the end section. The distance from end section to central axis is such that containers circulating on the end section are brought into contact with adhesive on a surface of an adjacent container.

15 Claims, 3 Drawing Sheets

(51) Int. Cl.
  *B65B 35/30* (2006.01)
  *B65B 35/54* (2006.01)
  *B65B 35/58* (2006.01)
  *B65G 54/02* (2006.01)
  *B65B 51/02* (2006.01)
  *B65B 65/00* (2006.01)
  *B65G 47/08* (2006.01)
  *B65G 47/86* (2006.01)

(52) U.S. Cl.
  CPC .............. *B65B 35/58* (2013.01); *B65B 51/02* (2013.01); *B65B 65/003* (2013.01); *B65G 54/02* (2013.01); *B65G 47/088* (2013.01); *B65G 47/842* (2013.01); *B65G 2201/0244* (2013.01); *Y10T 156/1744* (2015.01)

(58) Field of Classification Search
  CPC . B65G 2201/0244; B65B 17/02; B65B 21/04; B65B 21/06; B65B 27/04; B65B 35/16; B65B 35/30; B65B 35/36; B65B 35/44; B65B 35/54; B65B 35/58; B65B 57/04; B65B 57/14; B65B 65/003; B65B 51/02
  See application file for complete search history.

(56) References Cited

U.S. PATENT DOCUMENTS

| | | | |
|---|---|---|---|
| 6,868,652 B2 * | 3/2005 | Arends | ............ B65B 21/04 198/376 |
| 7,198,070 B1 | 4/2007 | Hansen et al. | |
| 7,726,464 B2 | 6/2010 | Cerf | |
| 2010/0154356 A1 * | 6/2010 | Elsperger | ............... B65B 21/06 53/398 |

FOREIGN PATENT DOCUMENTS

| | | | |
|---|---|---|---|
| DE | 41 26 212 | 2/1993 | |
| DE | 4126212 A1 * | 2/1993 | |
| DE | 10040531 A1 * | 2/2002 | |
| DE | 10 2006 037 105 | 2/2008 | |
| DE | 102006037105 A1 * | 2/2008 | |
| DE | 2 202 159 | 6/2010 | |
| DE | 10 2009 025 824 | 11/2010 | |
| DE | 102009025824 A1 * | 11/2010 | |
| DE | 10 2009 044 271 | 4/2011 | |
| DE | 102009044271 A1 * | 4/2011 | |
| DE | 102012005925 B3 * | 11/2012 | ............. B65B 17/02 |
| EP | 1 495 973 | 1/2005 | |
| EP | 1495973 A1 * | 1/2005 | |
| EP | 2 096 039 | 9/2009 | |
| EP | 2096039 A1 * | 9/2009 | |
| EP | 2202159 A1 * | 6/2010 | |
| EP | 2 258 625 | 12/2010 | |
| EP | 2258625 A2 * | 12/2010 | |
| WO | WO2013/079164 | 6/2013 | |
| WO | WO 2013079164 A1 * | 6/2013 | |

* cited by examiner

DEVICE FOR FORMING PACKAGED UNITS

RELATED APPLICATIONS

This application is the national stage entry under 35 USC 371 of PCT/EP2013/000856, filed on Mar. 21, 2013, which claims the benefit of the May 23, 2012 priority date of German application 10 2012 010 087.6, the contents of which are herein incorporated by reference.

FIELD OF DISCLOSURE

The invention relates to packaging, and in particular, to a device for making bundles of articles.

BACKGROUND

In known ways to bundle containers, the containers are supplied on a transport level of a conveyor. The containers stand upright and with their container axes oriented vertically or substantially vertically. They arrive oriented randomly in a wide stream of containers. A set of forming lanes receives this wide stream of containers and converts it into multiple one-lane streams of containers. Further process stages separate the containers to form subsequent bundles or container groups from the one-lane streams of containers. This is followed by bringing together the necessary number of containers into a compacted container group in which the containers lie against each other by multiple lateral or circumferential surfaces, i.e. by contact-or-touching surfaces thereof. Finally, the containers are joined together to form a compact and solid or stable bundle.

It is known to shrink-wrap containers together to form the bundle. However, a disadvantage of shrink-wrap is the cost of providing the heating to shrink the shrink film.

Another known way to bundle containers together is by strapping. This involves using a loop to reach around the container group and to bind them together to form a bundle. The strapping can also be made to adhere to the containers.

A disadvantage of strapping is that once a single container is removed from a strapped bundle, the strapping can no longer hold the remaining containers in the bundle together. This loss of structural integrity is not limited to the case in which one cuts or severs the strapping. It occurs even when one removes a container from the bundle without cutting through the strapping.

SUMMARY

A purpose of the invention is to provide a device and a method for making a container-bundle that avoids the use of strapping, that, despite the absence of strapping, prevents containers from adopting a nesting position during transport, and that also preserves cohesion of remaining items upon removal of one or more items from a bundle.

In one aspect, containers coming from a wide container stream are converted into multiple one-lane streams of containers by forming lanes. These containers are combined to form the subsequent bundle with at least one separating and/or compacting unit for separating and compacting a predetermined number of containers. Coating elements are provided so that at least one of the containers in the bundle has a bonding-or-adhesive agent and/or an application of bonding-or-adhesive agent at least on one contact-or-touching surface.

In another aspect, a linear conveyor is provided with driven controllable conveying elements, each of which circulates along a guide element. Each conveying element has a top guide that can be moved axially and/or that can be rotated relative to the conveying element. The guide element has, on a feed strand thereof, a central section extending parallel to a central axis. The central section merges into a transition section oriented in the direction towards the central axis. The transition section is connected to an end section extending parallel to the central axis.

As used herein, containers include PET bottles, as well as bottles, cans, tubes, and pouches that are made of metal, glass and/or plastic. Containers also include other kinds of packages, including those that are suitable for filling with liquid or viscous products, and containers that have already been combined into groups, such as multi-packs. The containers of a bundle are arranged in a non-nesting position.

As used herein, "bonding or adhesive agent" refers to all materials or masses that promote an adhesive connection between containers, in particular connections, materials, or masses that, when applied in the liquid or viscous state, form a self-adhesive coat and/or effect an adhesive connection under the application of pressure, as a result of furnishing energy, and/or after hardening or curing, which is typically accompanied by furnishing energy. The term "bonding or adhesive agent" also includes multi-layer materials, e.g. those comprising at least one carrier material that is coated with a material with which an adhesive connection between containers is possible, i.e. a material that displays bonding and/or adhesive action at least on two sides. Bonding-or-adhesive agents such as these can be termed "pads."

As used herein, an "adhesive" container is a container that has bonding-or-adhesive agent, or is provided with an application of bonding-or-adhesive agent. The bonding-or-adhesive agent is preferably selected such that the containers can be released from the bundle or separated from each other manually and non-destructively.

In some embodiments, the coating elements apply liquid adhesive agent. The coating elements can also apply low-viscosity UV-cured adhesive. Hot glue can also be used, but cools very quickly, and thus could possibly lose its adhesive properties before the containers in the bundle unit are adequately adhered to each other. A UV-cured adhesive is also advantageous because it is particularly easy to adjust its properties.

Some embodiments have a curing station or a curing stretch downstream of the coating elements, stationary or along the linear conveyor above it, or underneath it. An example of a curing station is a tunnel with UV lighting.

In some embodiments, conveying elements have vertically-oriented chutes. A corresponding control unit controls an associated conveying element separately from other conveying elements. This is particularly useful because a conveying element can thus have a conveying speed adapted to whatever requirements are at hand.

In other embodiments, a linear drive drives or controls the conveying element. In a preferred embodiment, the linear drive is an electromagnetic direct drive. However, it is also feasible to have a separate drive for each transport element. In one embodiment, the separate drive is a servomotor.

The guide element can also be a guide rail along which the conveying element is moved. The guide element has a feed strand and a rear strand with deflection sections arranged between in each case. The guide element itself does not have any conveying speed. Only the conveying elements are moved relative to the guide element. The rear strand is arranged on the feed strand in relation to the guide element.

In one embodiment, each conveying element transports a single vertically-oriented container. With the particular top guides, the containers are conveyed, held on the conveying element, from the inlet side past the coating elements to the outlet side. In a first embodiment, the containers are moved while held at their tops so that they sway freely.

It is also possible to transport containers by having their bases rest on a conveyor belt. In another embodiment, a container stands upright on a contact device while held at its top. The contact device can be moved axially and/or can be rotated relative to the conveying element. On the inlet side, the containers are transferred onto an inlet conveyor. On the outlet side, the containers, which have been provided with bonding-and-adhesive agent, are transferred onto an outlet conveyor. The inlet and the outlet conveyors can be conveyor belts.

In some embodiments, each top guide and each optional contact device can be controlled separately from each other. The top guides can have packing or centering bells to hold the containers on their opening sides. In some embodiments, the contact devices are rotary plates.

Preferably, the top guides and/or contact devices are movable relative to the conveying element, and thus relative to the chutes. Thus, for example a targeted orientation of the containers according to design characteristics, labels, or similar characteristics, can be carried out so that the containers are oriented identically to each other within the subsequent bundle.

It is preferable if every top guide or contact device is controllable separately, i.e. independently of the others. The control signals or control movements can be caused by a corresponding control unit, and also by a central control unit.

Some embodiments include a corresponding inspection device that detects actual positions of containers. Furthermore, a corresponding inspection device could simply be provided that detects actual positions of containers using characteristics to be examined, for example using label position. It is preferable if the top guides or contact devices (rotary plates) can, in addition to being rotatable about their axes, also be axially movable.

The containers can also be moved while swaying freely. Due to the existing levels of freedom, different necessary position changes can be superimposed, so that each container can be oriented into the desired target position in accordance with the other containers. Due to the freely swaying movement, there is no frictional resistance acting on the base. Axial mobility of the top guide or the contact device is therefore not needed.

It is also expedient for the conveying elements to have dimensions such that the containers project over the conveying elements. The containers can thus be made to lie against each other by bringing the conveying elements together.

It is also expedient for each conveying element to be controllable separately from the other conveying elements. Thus, a particular conveying element can have different speeds along its transport path. In particular, the conveying elements that have reached the rear strand can move along the rear strand at a higher speed than the conveying elements that are still moving along the feed strand. This means that the number of conveying elements in the system can be advantageously reduced relative to the number required in a system in which conveying elements are not speed-controllable.

It is expedient for each conveying element to be controllable separately from the other conveying element in each case. Thus, the conveying element can have different speeds along its transport path. In particular, the conveying elements that have reached the rear strand can here have a higher speed than the conveying elements that are still moving along the feed strand. Thus, the number of conveying elements in the system can be advantageously reduced relative to conveying elements that are not speed-controllable, as in particular along the rear strand an initially higher speed can be controlled, wherein the conveying elements in the area of the rear-strand end can be in standby position. Along the transport path of the feed strand, on the other hand, the particular conveying elements can have the same speed as each other. In a preferred embodiment, it can be provided for the conveying elements in the feed strand to be controlled at different speeds. Thus, the conveying elements in the feed strand can be brought together on the inlet side along a partial section of the central section to the partial bundle or the subsequent bundle, e.g., to a group of, for example, three conveying elements. Thus, one orientation can already take place. Along the further central section, the group brought together can be split in order, for example, to facilitate provision with bonding or adhesive agent, in order to then bring the group together again provided with bonding or adhesive agent.

In a preferred embodiment, the conveying elements that move along the rear strand can move at an initially higher speed. Along the transport path of the feed strand, on the other hand, the conveying elements can all move with the same speed.

In a preferred embodiment, the conveying elements that are on the feed strand can be controlled to move at different speeds. This makes it possible to bring together the conveying elements in the feed strand on the inlet side along a partial section of the central section to the partial bundle or the subsequent bundle, to a group of, for example, three conveying elements. Thus, one orientation can already take place. Along the further central section, the group that brought was together can be split apart to facilitate application of bonding-or-adhesive agent. The group can then be recombined having provided the containers with bonding-or-adhesive agent.

In a preferred embodiment, the coating elements or coating stations are arranged in the central section before the transition section. The coating elements provide the containers with bonding-or-adhesive agent. The containers, which have been optionally oriented correctly relative to each other, can be moved against each other by bringing the conveying elements together. Because the contact-and-touching surfaces of the containers project over the conveying element, a contact pressure can be generated. This contact pressure promotes adhesive or bonding connection of the containers to each other.

In one embodiment, seen in the conveying direction, successive coating elements or coating stations are provided. This also takes account of the optional rotation of the container held on the particular pack or centering bell. By rotating the containers along the conveying direction, contact-and-touching surfaces seen in the circumferential direction of the containers can be provided with bonding-or-adhesive agents. This promotes an adhesive bond, so that almost every container can form an adhesive bond with the adjacent container at at least two contact-and-touching surfaces.

In another embodiment, the transition section is domed. Preferably, the transition section is concavely domed relative to the central axis. Thus, a gentle transition from the axially extending central section to the end section extending parallel to the central axis can be achieved. Due to the transition section's orientation in the direction towards the central axis, the end section can be brought closer to the central axis.

The partial bundle emerging from the linear conveyor can then be brought together with other partial bundles on the same linear conveyor to form a completed bundle. In this way, completed bundles can be made in a single-row or multi-rows. This bringing-together can take place at downstream devices. However, partial bundles or containers that have been provided with bonding-or-adhesive agent should be brought together as quickly as possible before any curing and/or setting station.

Some embodiments have two identically made linear conveyors provided opposite each other as mirror images about a central axis. The coating elements are arranged between the two central sections. An advantage of this embodiment is that partial bundles from both linear conveyors can be brought together to form a bundle even in the end section by having the end sections brought sufficiently close to each other to positively influence an adhesive bond. Moreover, a force can be applied that squeezes or presses the containers against each other in all favorable directions so that, for example, a two-row bundle can be formed from six containers.

A partial bundle can be formed, for example, from three or six containers. A force can be exerted crosswise or lengthwise to the conveying direction by the top guides or by the contact devices, as indicated above, so that the relevant containers of a partial bundle can be pressed or squeezed together under the effect of force. Such a force promotes formation of the adhesive bond. In addition, the top guides can be brought close together to increase the acting pressure.

Two separate one-lane flows are to be taken up on the inlet side by two linear conveyors. On the outlet side, two separate outlet flows or one outlet flow can be discharged, if on the end-section side, no bringing-together of the two partial bundles is provided.

If UV-cured adhesive is applied, a curing station or stretch can also be provided. The curing station can be arranged on the end-section side. A typical embodiment has a tunnel with UV lighting. To support the movement of the entire bundle in the direction to the ejection side, outlet conveyor driver elements can also be provided.

The particular bundle can have, as seen in the conveying direction, a single-row or multiple rows. For example, bundles can have two rows or three rows. It is possible to arrange the coating elements or coating stations not only rigidly on the linear conveyor, but also movably, so that the coating elements can be carried along at least a partial stretch with the particular container stream.

In some embodiments, suitable devices are provided for adding a carrying element, such as a handle, to a bundle with a carrying element. These devices are arranged downstream of the outlet side or at an appropriate place on the linear conveyor. The carrying element can be secured on the bundle with the bonding-or-adhesive agent.

In one aspect, the invention features an apparatus for making bundles of containers from containers that have arrived in a wide container stream that has been converted into multiple one-land container streams by formation of lanes, the bundles of containers being formed by combining partial bundles into subsequent bundles using at least one separating-and/or-compacting unit for separating and compacting a predetermined number of the containers as the container move along a conveying direction. Such an apparatus includes a first linear conveyor, a guide element, driven and controllable conveying elements, and application elements. Each application element is configured to apply adhesive to a portion of a container surface. The conveying elements travel along the first linear conveyor and are driven and controlled to circulate along the guide element. Each conveying element comprises a container guide that is rotatable relative to the conveying element. The guide element comprises a feed strand having a central section, a transition section, and an end section. The central section merges into the transition section, and the transition section merges into the end section. The central section and the end section are separated from a central axis by corresponding first and second distances, with the second being less than the first. The second distance is selected such that containers circulating on the end section are brought into contact with adhesive on a surface of an adjacent container. This surface has a normal vector that crosses a direction in which the adjacent container is moving.

In some embodiments, each of the conveying elements comprises a vertically oriented chute.

In other embodiments, each of the conveying elements can be controlled and driven separately from other conveying elements.

Yet other embodiments comprise a linear drive, wherein each of the conveying elements can be driven and controlled by the linear drive. Among these are embodiments in which the linear drive comprises an electromagnetic direct drive.

Also among the embodiments are those in which the guide element comprises a rear strand, and the deflection section is arranged between the rear strand and the feed strand.

In alternative embodiments, each of the conveying elements moves a single vertically-oriented container.

Additional alternative embodiments include those in which each of the conveying elements is configured to move a container by holding on a top thereof such that the container sways freely.

In other embodiments, each of the conveying elements is configured to move a container by holding on a top thereof such that the container stands upright on a conveyor along at least a partial section thereof.

In yet other embodiments, each of the conveying elements comprises a top guide and a contact device for a container. The top guide and the contact device are controllable independently of each other, and the contact device is rotatable relative to the conveying element. Among these are embodiments in which the contact device comprises a rotary plate, Yet other embodiments include those in which the transition section comprises a domed transition section. Among these are embodiments in which the transition section is domed in a manner such that the transition section approaches the axis.

Yet other embodiments comprise a second linear conveyor that is identical in structure to the first linear conveyor, and arranged opposite the first linear conveyor relative to the central axis. In these embodiments, the coating elements are arranged opposite each other between central sections of the first and second linear conveyors. Among these are embodiments in which the first and second linear conveyors that are movable relative to each other.

In yet another aspect, the invention features an apparatus for bundling containers. Such an apparatus includes a linear conveyor, a guide element, conveying elements, and application elements, each of which applies adhesive to a portion of a container surface, The conveying elements are driven and controllable to travel along the conveyor and to circulate along the guide element. Each conveying element has a container guide that rotates relative to the conveying element. The guide element has a feed strand with central, transition, and end sections that merge into each other. The central section is further from the central axis than the end section. The distance from end section to central axis is such that containers circulating on the end section are brought into contact with adhesive on a surface of an adjacent container.

The invention thus provides a device for making a bundle that, despite not using a surrounding film and/or despite not using a strapping, prevents, in a simple way, the nesting of containers during transport. In addition, following the removal of one or more items from a bundle, the cohesion of the remaining items in the bundle unit is preserved or can be restored. Avoiding the use of a film or a strap also avoids burdening the environment both because waste is avoided and because resources for making the films or strapping, which are usually manufactured from plastic, are spared. During transport, thus in the continuous operation of the device for making bundles, or of the packaging machine, the containers in the bundle are adhered directly to each other. In addition, a film-free bottle pack with a minimal coat of adhesive agent can be achieved that has an adequate bonding of the individual containers to each other.

In an apparatus according to the invention, extremely high performance is achievable. This is due in part to having conveying elements with adjustable speed, acceleration, and deceleration.

As used herein, containers include PET bottles, as well as bottles, cans, tubes, or pouches, in each case made of metal, glass and/or plastic, as well as other packaging means, in particular those suitable for being filling with liquid or viscous products, as well as containers already combined into groups, or multi-packs. Containers of this kind, e.g. PET bottles, have a contact area that is spherically domed so that the containers can effectively roll against each other around a circumferential track, or rolling ring. With glass bottles, this can be recognized in the event of reuse of the bottle, for example, by means of the wear ring recognizable due to it being lighter. With PET bottles, "rolling rings" of this kind can be arranged not only in the top area but also in the base area.

Further developments, benefits and application possibilities of the invention arise also from the following description of examples of embodiments and from the figures. In this regard, all characteristics described and/or illustrated individually or in any combination are categorically the subject of the invention, regardless of their inclusion in the claims or reference to them. The content of the claims is also an integral part of the description and is hereby incorporated by reference.

BRIEF DESCRIPTION OF THE FIGURES

The invention is explained in more detail below by means of the figures using an example of an embodiment. In the figures.

In the various figures, the same parts are always given the same reference numbers, and hence they are generally also only described once.

DETAILED DESCRIPTION

Figure 1:
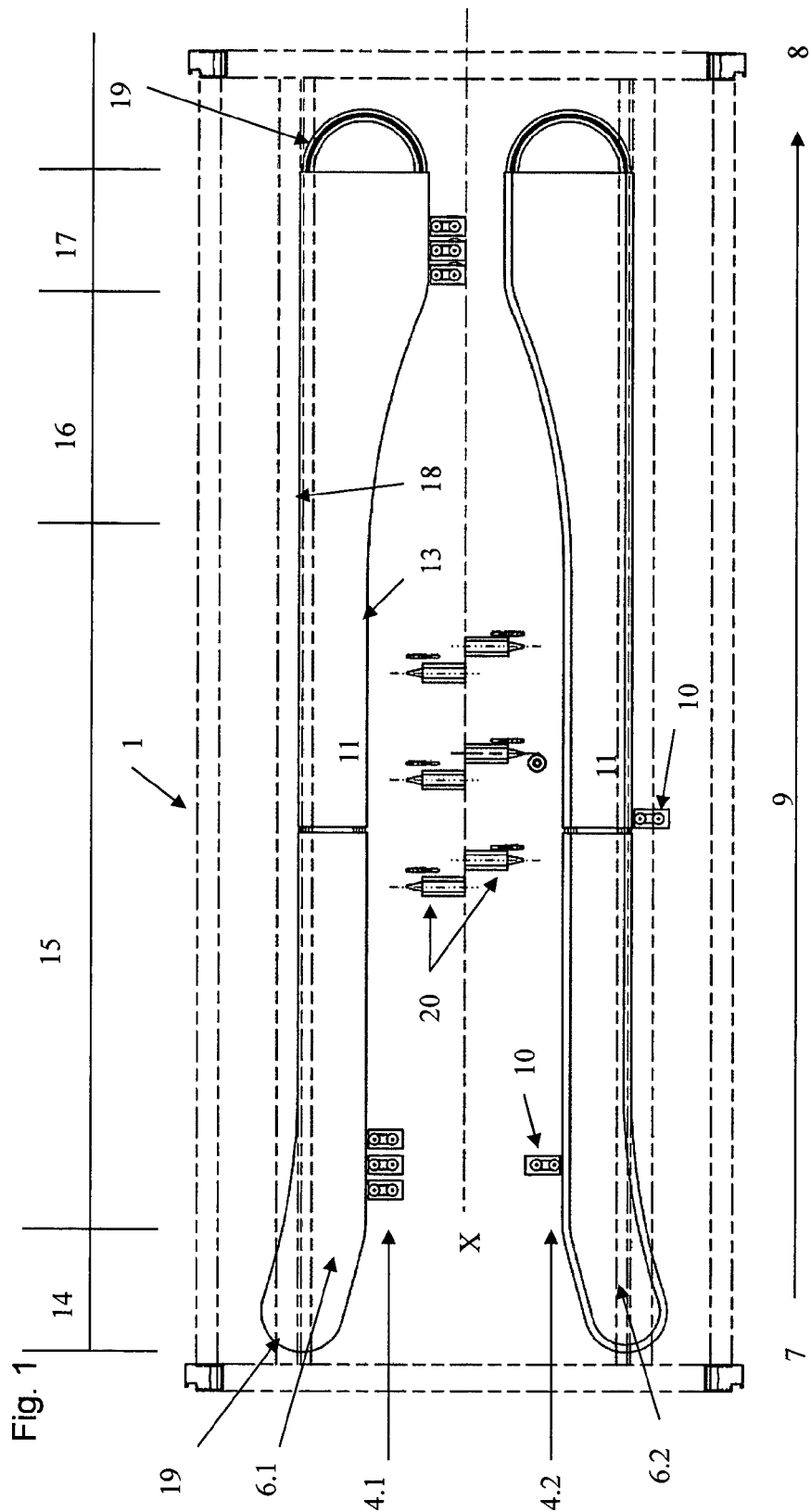
FIG. 1 is plan view of a partial section of a device for making.

FIG. 1 shows a partial section of a packaging machine 1 for making completed bundles 2 from containers 3. As shown in FIG. 1, a wide stream of containers 3 is converted into multiple container-streams 4.1, 4.2.

Within a container-stream 4.1, 4.2, the containers 3 are randomly oriented relative to each other, for example, with regard to their container and/or decorative characteristics.

The packaging machine 1 separates and brings together a predefined number of containers 3 and compacts them into partial bundles 5.1, 5.2. These partial bundles 5.1, 5.2 are subsequently brought together to form a complete bundle 2. At least one of the containers 3 of the completed bundle 2, and preferably each container 3 in the completed bundle 2, has a bonding-or-adhesive agent and/or an application of bonding-or-adhesive agent at least on one contact-or-touching surface thereof. By way of example, just one element of the partial bundle 5.2 is illustrated.

FIG. 1 shows identical linear conveyors 6.1, 6.2 that move containers 3 from an inlet side 7 towards an outlet side 8 along a conveying direction 9. As used herein, "upstream" means in a direction opposite the conveying direction and "downstream" means in the conveying direction 9. The linear conveyors 6.1, 6.2 are mirror images of each other relative to a central axis X.

Figure 2:
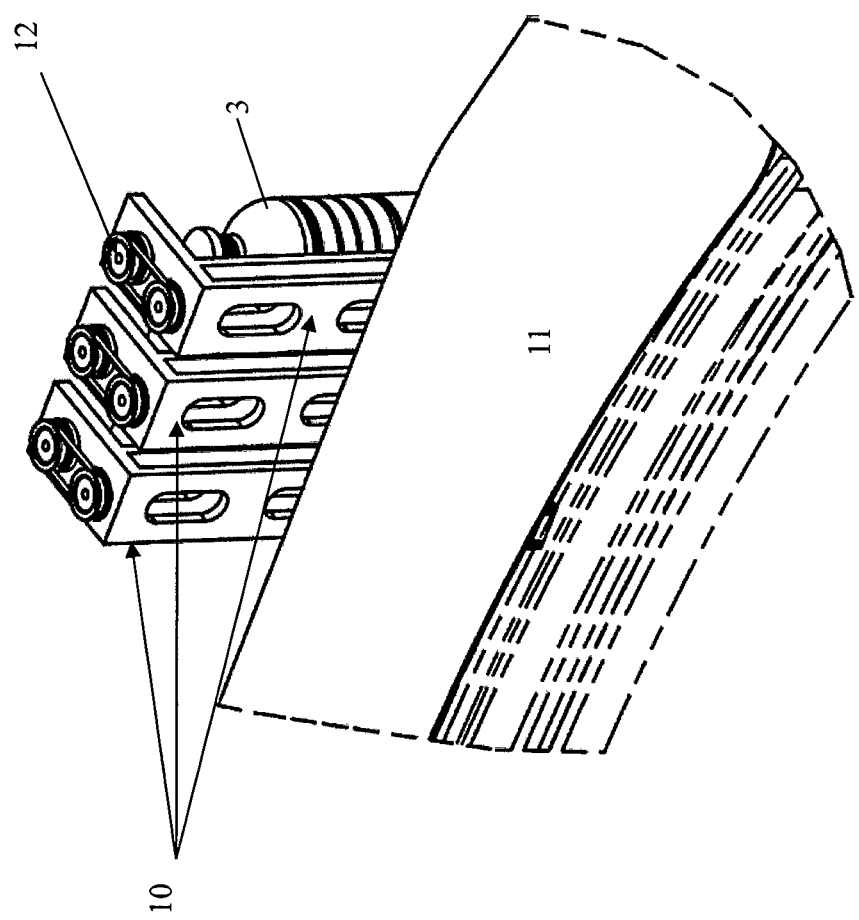
FIG. 2 is a side view of a magnified partial section of the device from FIG. 1 with conveying elements brought together.

Each linear conveyor 6.1, 6.2 has driven controllable conveying elements 10. Each conveying element 10 circulates along a guide element 11. Each conveying element 10 also has a top guide and a contact device. The contact device can be a rotary plate. The top guide can have a packing-and-centering bell that holds the container 3 on that side of the container that has an opening. At least the top guide of each conveying element 10 can be moved axially and/or rotated relative to the conveying element 10. A belt drive 12, shown in FIG. 2, rotates a conveying element 10. In an alternative embodiment, a rotary plate rotates a conveying element 10.

In some embodiment, each conveying element 10 is made such that a part of the container projects over or protrudes above the conveying element 10. These embodiments dispense with the need for axial movement. Containers 3 can be pressed against each other simply by bringing the conveying elements 10 together. If containers 3 with different dimensions are processed, a format change can be carried out easily and without complications. It is only necessary to exchange the conveying elements 10 with other conveying elements 10 that have correspondingly adapted dimensions.

Each guide element 11 has a feed strand 13. Along the feed strand 13 in the conveying direction 9 are an inlet section 14, a central section 15 following the inlet section 14, a transition section 16 following the central section 15, and an end section 17 following the transition section 16. The central section 15 extends parallel to the central axis X in the direction towards the transition section 16. The transition section 16 is domed relative to the central axis X. In the example shown, the transition section 16 is concavely domed so that as it approaches the end section 17, it also approaches the central axis X. The end section 17 extends parallel to the central axis X.

In the illustrated example, both transition sections 16 are domed so that they both turn inward towards the central axis X. As a result, the end sections 17 are closer to the central axis X than the central sections 15. The inlet sections 14 are formed so that a funnel-shaped inlet area is formed, as shown in FIG. 1.

Each guide element 11 also has a rear strand 18. For each guide element 11, a deflection section 19 is arranged between the rear strand 18 and the feed strand 13.

Each conveying element 10 includes a vertically oriented chute that can be controlled and driven separately from other conveying elements. In one embodiment, the conveying elements 10 are driven and controlled by a linear drive. An example of such a linear drive is an electromagnetic direct drive.

Each conveying element 10 moves single container 3. The container 3 is oriented vertically with its wall projecting beyond the conveying element 10. The particular portion of the wall that projects is in the area of the contact-or-touching surface.

Because a conveying element 10 can be controlled separately from other conveying elements 10, each conveying element 10 can have different speeds as it travels along its transport path. In particular, the conveying elements 10 that have reached the rear strand 18 can be made to move at a higher speed than the conveying elements 10 that are still moving along the feed strand 13. This means that the number of conveying elements 10 in the system can be advantageously reduced relative to conveying elements 10 that are not speed-controllable.

Once they are on the rear strand 18, conveying elements 10 move at an initially higher speed until they reach an area of the rear-strand 18 that functions as standby position. Along the feed strand 13, on the other hand, the conveying elements 10 can have the same speed as each other. In a preferred embodiment, conveying elements 10 along the feed strand 13 can also be moved at different speeds. Thus, the conveying elements 10 along the feed strand 13 can be brought together on the inlet side 7 along a partial section of the central section 15 to a partial bundle 5.1, i.e. to a group of, for example, three conveying elements 10. By this time, one orientation of containers can already take place.

Along the central section 15, the group brought together can temporarily be split in order to permit coating stations 20 to apply bonding-or-adhesive agent. The group can then be rejoined, but this time with bonding-or-adhesive agent in place, and with the containers optionally oriented correctly, as can be seen in the end section 17 of the linear conveyor 6.1.

An orientation of the containers 3 can take place upstream of the coating stations 20. In a preferred embodiment, the coating stations 20 are arranged in the central section 15 upstream of the transition section 16. The coating elements 20 apply bonding-or-adhesive agent on containers 3. When properly oriented, the containers 3 can be moved against each other by bringing together those conveying elements 10 that carry those containers. Because the contact-and-touching surface of a container 3 projects over the conveying element 10 in the circumferential direction. Such movement generates a bonding pressure can be generated by such movement. This promotes adhesive or bonding connection of the containers 3 to each other.

In the illustrated embodiment, each linear conveyor 6.1, 6.2 has multiple coating stations 20 disposed in succession along the conveying direction 9. This takes account of the optional rotation of a container held on a particular pack-or-centering bell. By rotating the container 3 as it moves along the conveying direction 9, multiple contact-and-touching areas along the circumferential direction of the container 3 can be provided with bonding-or-adhesive agent. This enables each container 3 to form an adhesive bond with immediately adjacent container 3 on at least two contact-and-touching surfaces.

Figure 3:
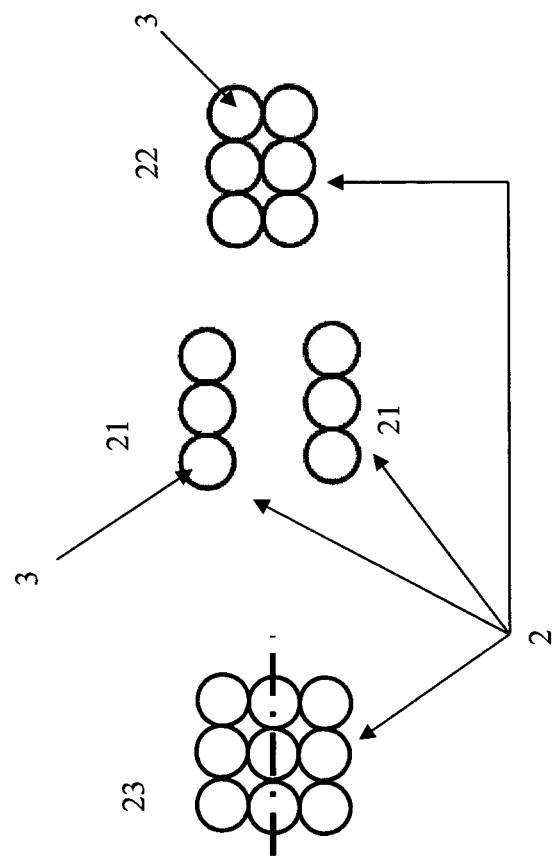
FIG. 3 shows examples of formats of bundles in plan view.

FIG. 3 shows non-limiting examples of first, second, and third bundle formats 21, 22, 23. Bundles in very different embodiments can be formed with the two linear conveyors 6.1, 6.2. Thus, multiple, for example three, containers 3 can be brought together by each linear conveyor 6.1, 6.2 into one partial bundle in the first bundle format 21. This can then be conveyed further and/or subsequently processed to form one bundle. A particular bundle format 21, 22 or 23 can thus be formed from multiple, for example two partial bundles. For example, the second bundle format 22 is formed from two partial bundles having the first bundle format 21. The third bundle format 23 is formed from three partial bundles having the first bundle format 21.

The particular embodiment shown, which has two identical linear conveyors 6.1 and 6.2 facing each other, allows partial bundles to be brought together and united in the end section 17 so that two partial bundles being brought together, or their containers 3, can project by their girth not only over the conveying elements 10, but also over the central axis X. As a result, the containers 3 of the two partial bundles having the first format 21 can be brought together under the application of force to form a bundle having the second format 22.

On the inlet section 14, inspection devices can be provided to orient the containers 3. The containers 3 are held in an oriented way in the conveying element 10. As a result, all containers 3 in a bundle can be made to have the same orientation.

Having described the invention, and a preferred embodiment thereof, what is claimed as new, and secured by Letters Patent is:

1. An apparatus for making bundles of containers from containers that have arrived in a wide container stream that has been converted into multiple one lane container streams by formation of lanes, said bundles of containers being formed by combining partial bundles into subsequent bundles using at least one separating-and/or-compacting unit for separating and compacting a predetermined number of said containers as said containers move along a conveying direction, said apparatus comprising a first linear conveyor, a guide element, conveying elements, and coating elements, wherein each coating element is configured to apply adhesive to a portion of a container surface, wherein said conveying elements travel along said first linear conveyor, wherein said conveying elements are driven and controlled to circulate along said guide element, wherein each conveying element comprises a container guide, wherein said container guide is rotatable relative to said conveying element, wherein said guide element comprises a feed strand, wherein said feed strand comprises a central section, a transition section, and an end section, wherein said central section merges into said transition section, wherein said transition section merges into said end section, wherein said central section is separated from a central axis by a first distance, wherein said end section is separated from said central axis by a second distance, wherein said second distance is less than said first distance, wherein said second distance is selected such that containers circulating on said end section are brought into contact with adhesive on a surface of an adjacent container, and wherein said surface has a normal vector that crosses a direction in which said adjacent container is moving.

2. The apparatus of claim 1, wherein each of said conveying elements comprises a vertically oriented chute.

3. The apparatus of claim 1, wherein each of said conveying elements can be controlled and driven separately from other conveying elements.

4. The apparatus of claim 1, further comprising a linear drive, wherein each of said conveying elements can be driven and controlled by said linear drive.

5. The apparatus of claim 4, wherein said linear drive comprises an electromagnetic direct drive.

6. The apparatus of claim 1, wherein said guide element comprises a rear strand, and wherein said apparatus further comprises a deflection section that is arranged between said rear strand and said feed strand.

7. The apparatus of claim 1, wherein each of said conveying elements moves a single vertically-oriented container.

8. The apparatus of claim 1, wherein each of said conveying elements is configured to move a container by holding on a top thereof such that said container sways freely.

9. The apparatus of claim 1, wherein each of said conveying elements is configured to move a container by holding on a top thereof such that said container stands upright on a conveyor along at least a partial section thereof.

10. The apparatus of claim 1, wherein each of said conveying elements comprises a top guide and a contact device for a container, wherein said top guide and said contact device are controllable independently of each other, and wherein said contact device is rotatable relative to said conveying element.

11. The apparatus of claim 10, wherein said contact device comprises a rotary plate.

12. The apparatus of claim 1, wherein said transition section comprises a domed transition section.

13. The apparatus of claim 12, wherein said transition section is domed in a manner such that said transition section approaches said axis.

14. The apparatus of claim 1, further comprising a second linear conveyor, wherein said second linear conveyor is identical in structure to said first linear conveyor, wherein said first and second linear conveyors are arranged opposite each other relative to said central axis, and wherein said coating elements are arranged opposite each other between central sections of said first and second linear conveyors.

15. The apparatus of claim 14, wherein said first and second linear conveyors are movable relative to each other.

* * * * *